US008105062B2

(12) United States Patent
Cain

(10) Patent No.: US 8,105,062 B2
(45) Date of Patent: Jan. 31, 2012

(54) SYSTEMS AND METHODS FOR BLADDERLESS TIRE CURING

(75) Inventor: Don Cain, Gadsden, AL (US)

(73) Assignee: Curing Concepts, Inc., Gadsden, AL (US)

( * ) Notice: Subject to any disclaimer, the term of this patent is extended or adjusted under 35 U.S.C. 154(b) by 0 days.

(21) Appl. No.: 12/048,087

(22) Filed: Mar. 13, 2008

(65) Prior Publication Data

US 2008/0224365 A1    Sep. 18, 2008

Related U.S. Application Data

(60) Provisional application No. 60/894,600, filed on Mar. 13, 2007, provisional application No. 61/036,002, filed on Mar. 12, 2008.

(51) Int. Cl.
*B29C 35/04* (2006.01)

(52) U.S. Cl. ............... 425/44; 425/36; 425/32; 425/31; 264/326; 264/501

(58) Field of Classification Search ............... 425/44, 425/36, 32, 31, 445, 446; 264/326, 501
See application file for complete search history.

(56) References Cited

U.S. PATENT DOCUMENTS

| 3,329,748 | A | * | 7/1967 | Hugger ................. 264/40.5 |
| 3,963,394 | A |   | 6/1976 | Shichman et al. |
| 4,222,721 | A |   | 9/1980 | Gado |
| 4,400,342 | A |   | 8/1983 | Logan |
| 4,527,946 | A |   | 7/1985 | Singh et al. |
| 5,078,584 | A |   | 1/1992 | Drewel et al. |
| 5,133,653 | A | * | 7/1992 | Kubota et al. ................. 425/42 |
| 5,151,242 | A | * | 9/1992 | Soeda et al. ................. 264/572 |
| 6,277,317 | B1 | * | 8/2001 | Vannan et al. ................ 264/326 |
| 6,398,533 | B1 |   | 6/2002 | Hanya et al. |
| 6,402,490 | B1 |   | 6/2002 | Menard |
| 6,554,597 | B1 |   | 4/2003 | Ichimaru |
| 6,655,941 | B1 |   | 12/2003 | Fukuda |
| 6,729,865 | B2 |   | 5/2004 | Ichimaru |

* cited by examiner

*Primary Examiner* — Robert J Hill, Jr.
*Assistant Examiner* — Ninh Le
(74) *Attorney, Agent, or Firm* — Lanier Ford Shaver & Payne, P.C.; Jon E. Holland

(57) ABSTRACT

A system for curing tires that does not require a traditional bladder is described. The system disclosed has top and bottom assembly rings that are coupled to modified mold rings. The bottom assembly ring has a curing medium delivery system, which has ports and a diverter that disperses the curing medium thereby reducing the momentum of the curing medium striking a liner of the tire being cured. The system is adapted for easy installation to existing center post presses.

7 Claims, 18 Drawing Sheets

SYSTEMS AND METHODS FOR BLADDERLESS TIRE CURING

CROSS-REFERENCE TO RELATED APPLICATIONS

This application is related to U.S. Provisional Patent Application No. 60/894,600, entitled "System and Method for Bladderless Tire Curing" filed on Mar. 13, 2007, which is incorporated herein by reference. This application is also related to U.S. Provisional Patent Application No. 61/036,002, entitled "System and Method for Bladderless Tire Curing" filed on Mar. 12, 2008, which is incorporated herein by reference herein.

RELATED ART

To better understand the advantages and improvements achieved with the present disclosure, a brief discussion of tire construction and building procedures follows. A pneumatic tire is typically constructed by applying various components, or plies of the tire as flat stock, upon a rotating tire building drum to form a hollow, toroidal shaped green or uncured tire. The order of applying the components is typically as follows: first, an inner liner is wrapped upon the tire building drum; the inner liner is followed by carcass plies containing tire reinforcement, the carcass plies are followed (not necessarily in the following order) by beads, apexes, chafers and side walls. The carcass of the above first processing stage is then expanded and formed, via a second processing stage, into a toroidal shape where belts, overlays and treads are applied thereby forming a green tire in a manner well known in the art. The green tire is then removed from the second processing stage equipment and placed into a shaping and vulcanizing mold to provide the shape of the finished tire. The mold is sealed and the toroidal shaped green tire is heated and expanded radially outward into the mold periphery by injecting a curing medium, such as a pressurized gas, steam or a fluid into a curing bladder mounted within the mold and disposed within the green tire. As the curing bladder expands, it forces the tread and sidewalls of the green tire into contact with heated mold walls that shape and vulcanize (cure) the green tire into a fully vulcanized tire. During the radial expansion of the green tire within the shaping and vulcanizing mold, the toroidally shaped plies expand radially outward to dimensions slightly beyond those of the original green tire. In general, the curing bladder is made of an expandable elastomeric material, usually butyl rubber, for resistance to steam.

During the curing of tires in a line of presses, the curing bladder, sometimes costing around $40, within the mold periodically wears out or fails. In addition to the cost per bladder, a bladder mold for fabricating a bladder can cost around $100,000. The wearing out of the curing bladder has proven to be a difficult problem to overcome because of the harsh environment and demanding operating conditions to which the elastomeric bladder is subjected, being part of an assembly line that is operating around the clock and throughout the year. For example, the bladder is located in a heated mold and is constantly being expanded and contracted for each tire built. Moreover, the bladder is being subjected to high temperature, pressurized gas or fluid, such as steam, which is used to expand the bladder.

The high-paced manufacturing methods of building tires on an assembly line is limited by the time required to shape and vulcanize each green tire in the tire molds. The tire molds are very expensive and typically several tire molds are provided for each tire building drum. Still, the primary cause for downtime of the tire presses is the need to replace a defective or worn curing bladder. This fact, combined with the expense of purchasing and maintaining each of the tire molds, results in a concentrated effort by the tire industry to keep the tire molds operational. This effort is very expensive given the reduced tire production during the significant downtime that a tire mold is not operational, the labor cost for installing a new curing bladder and putting the tire mold back into operation, and the cost of manufacturing or purchasing the bladders themselves.

It is apparent that there is still a need to provide novel bladderless tire mold constructions and methods of operation for manufacturing tires on high-speed assembly lines that reduce: the time and/or labor costs for mounting a green tire in a shaping and vulcanization mold; the downtime when a tire mold is not operational; and the labor and material cost for installing a new curing bladder and putting the tire mold back into operation.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to bladderless curing and shaping systems and methods. The top and bottom assemblies shown in the figures are adapted to fit on existing curing center post presses.

Figure 1:
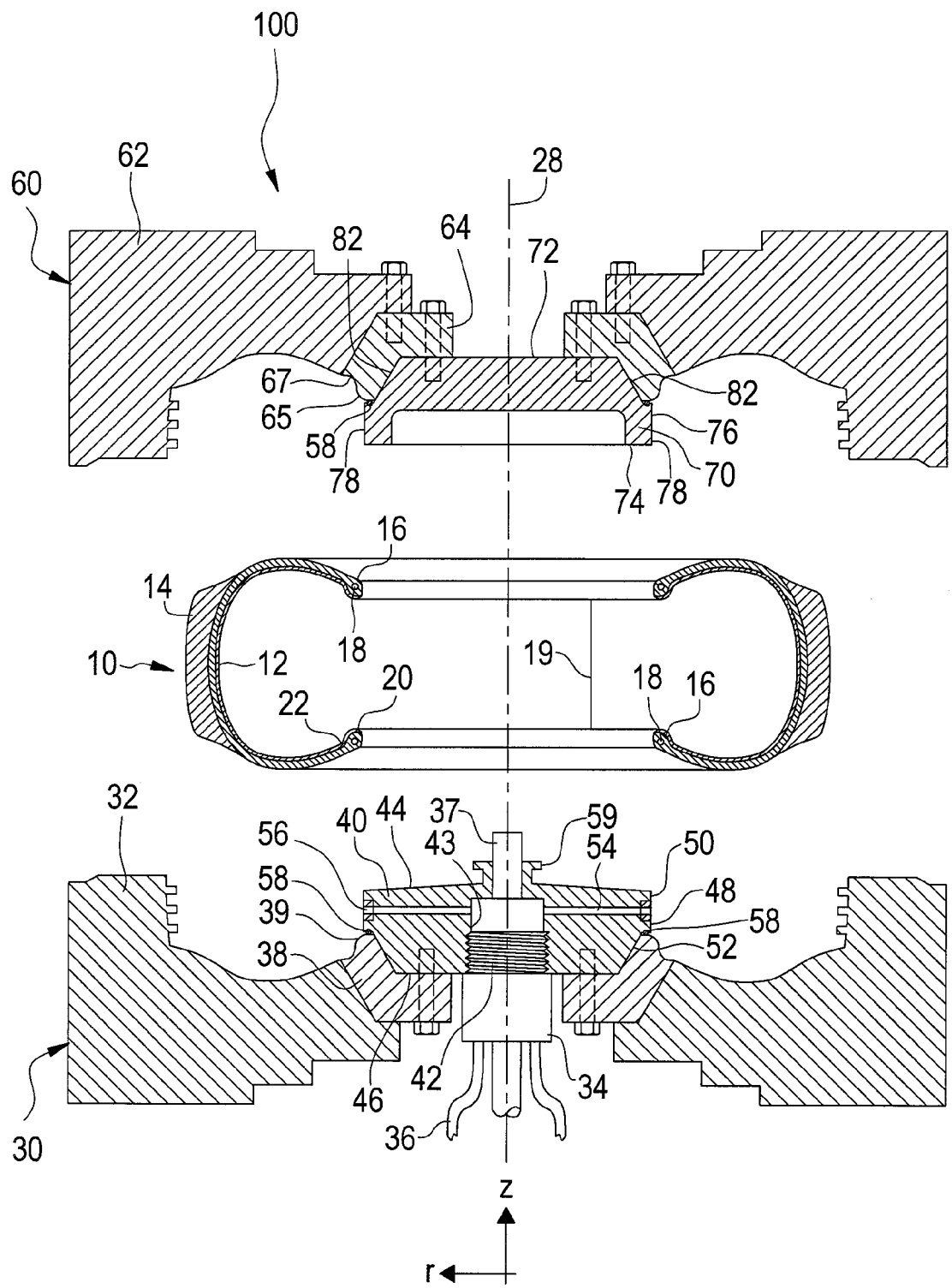
FIG. 1 is a cross section showing a green tire and an exemplary embodiment of an apparatus for a tire curing system of the present disclosure.

FIG. 1 shows a cross section of a tire curing system 100 for an exemplary embodiment of the present disclosure. The cross-hatched portions of FIG. 1 are generally circular in a plane parallel to the r-direction and orthogonal to the z-direction such that these portions are symmetrical about a center axis 28. The tire curing system 100 has a bottom assembly 30 and a top assembly 60, and a green tire 10 is situated therebetween. The green tire 10 is manufactured using conventional equipment and is then moved to the curing system 100. The green tire 10 has an inner liner 12, a tread 14 and a bead 16 with wire cords 18. Portions of the inner liner 12 overlap to form a seam 19. In this regard, in forming the green tire 10, one end of the inner liner 12 overlaps and is attached to the other end of the inner liner 12, thereby forming the seam 19, such that the inner liner 12 forms an endless loop. The bead 16 has a heel 22, furthest from the center axis 28 in the r-direction (radial direction) and a toe 20 closer to the center axis 28. As will be seen, the shape of heel 22 and toe 20 are transformed during the curing process. When the curing process is complete, the tire is said to be cured or vulcanized.

The bottom assembly 30 has a conventional bottom mold half 32, a bottom mold ring 38, a center post 34 and steam lines 36. The steam lines 36 typically receive steam from a steam source, although other curing mediums may be used. The bottom mold ring 38, as shown in FIG. 1, is abutted against a support ring, seen as a lip in the cross section view, on the bottom mold half 32. Resting on top of the bottom mold ring 38 is a bottom ring assembly 40. The bottom mold ring 38 has a concave surface 39 on the top side of the mold ring and furthest from the center axis 28. The bottom mold ring 38 is attached to the bottom ring assembly 40 with bolts coupled to threaded holes 45 that are arranged in a circular pattern (best seen in FIG. 11) wherein two bolts are shown in the cross section view. An O-ring 58 within a groove in the bottom ring assembly 40 provides a seal between the bottom ring assembly 40 and the bottom mold ring 38. In other embodiments other devices for sealing may be used.

Figure 11:
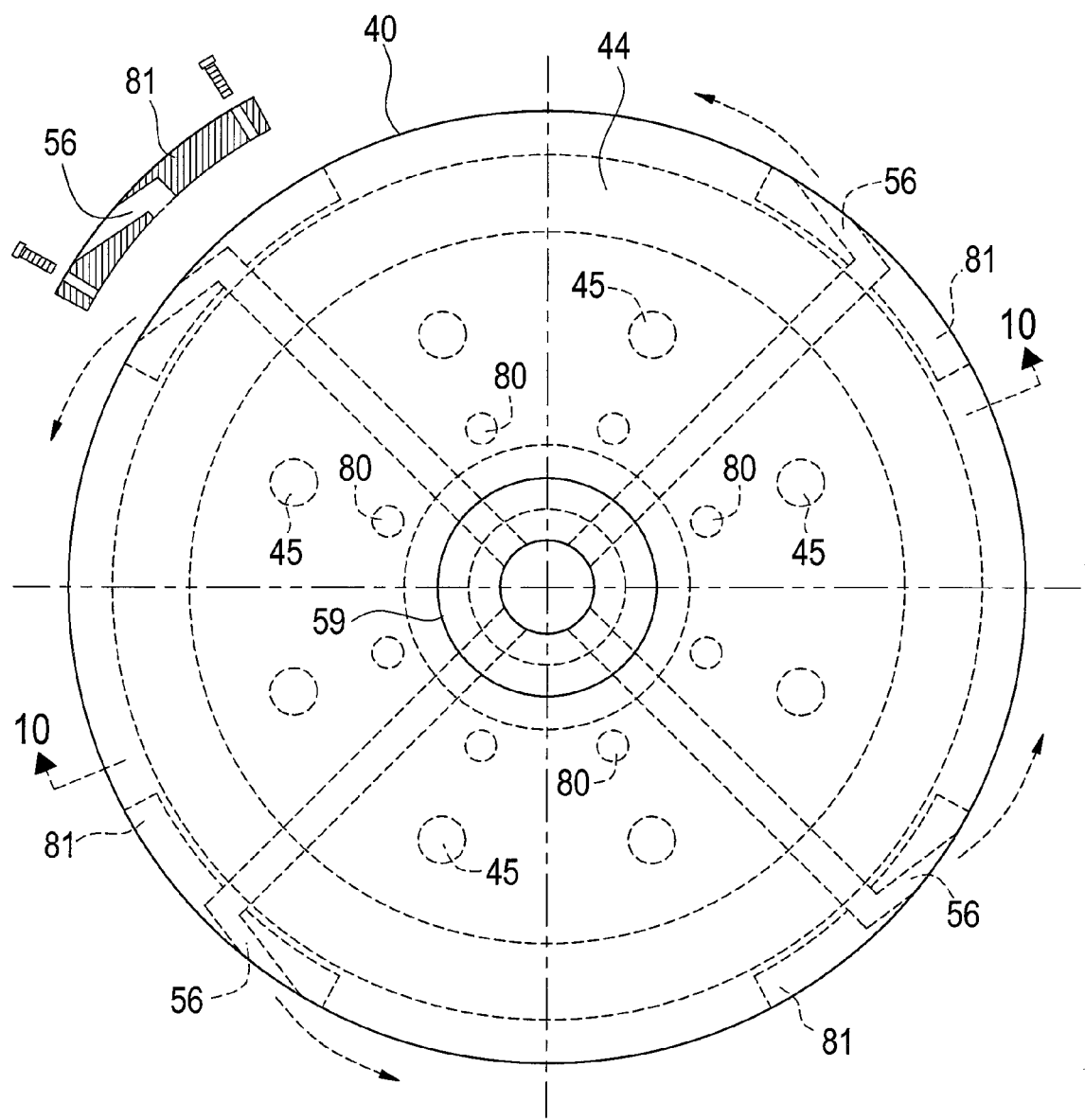
FIG. 11 is a top view of the bottom ring assembly of FIG. 1.

The bottom ring assembly 40, having threads within a hole 43 in the center of the bottom of the ring assembly 40, is attached to threads 42 of a conventional center post 34. Steam lines 36 extend downward, the negative z-direction, to the steam source and upward, the z-direction, for supplying steam to steam ports 54 in the bottom ring assembly 40. At the top of the bottom ring assembly 40 is a flange 59 that is used to secure (the securing clamp is not shown) the bottom ring assembly 40 to an inner post 37 of the conventional center post 34. The upper surface 44 of the bottom ring assembly 40 has a taper where the outside edge is lower than the portion of the top surface closest to the center axis 28, so that condensed steam, water, flows away from the center post during one of the curing steps. Although the steam ports 54 as shown in FIG. 1 are shown going in a radial direction, i.e. out from the center axis 28, angular slots 56 may direct the steam circumferentially as seen in FIG. 11.

The top assembly 60 has a conventional top mold half 62, a top mold ring 64 and a top ring assembly 70. The top mold half 62 is bolted, using conventional bolts arranged in a circular pattern, to threaded holes in the top mold ring 64. The top mold ring 64 is bolted to the top ring assembly 70 where there are threaded holes in the upper surface of the top ring assembly 70. The side surface 76 of the top ring assembly 70 has a tapered portion and a vertical portion. At the juncture of the vertical portion and the tapered portion is a groove for an O-ring 58. The groove traverses the circumference of the top ring assembly 70 and accepts an O-ring that forms a seal between the top mold ring 64 and the top ring assembly 70. However, it is possible to form a seal without the O-ring 58, and the O-ring 58 is unnecessary in other embodiments. The lower surface 74 of the top ring assembly 70 is essentially flat on the edges and has a downward (the negative z direction) facing cavity to provide clearance for the top of inner post 37.

Figure 2:
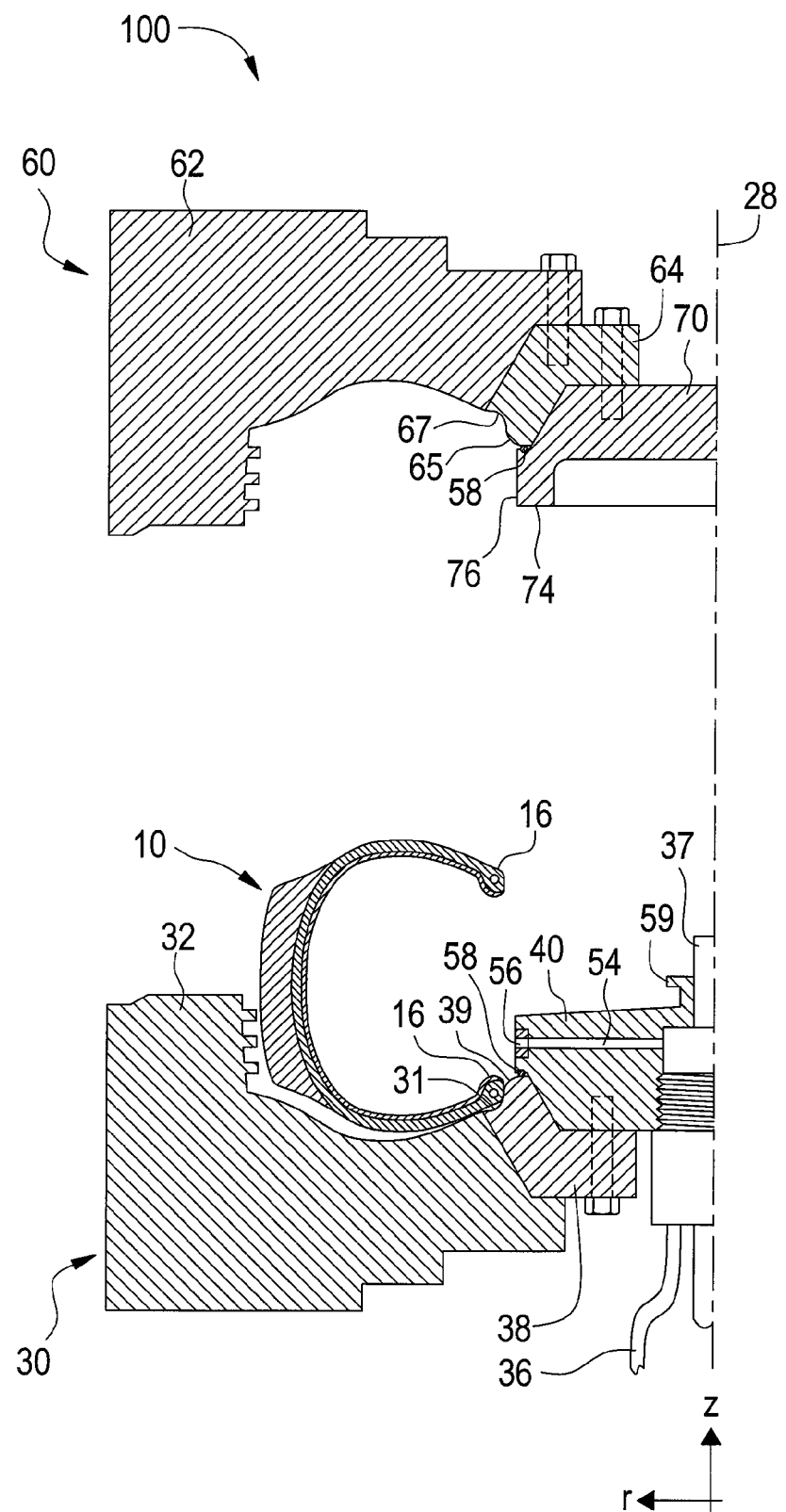
FIG. 2 is a partial cross section of the apparatus of FIG. 1 when the green tire is engaged with the bottom assembly of the apparatus.
Figure 3A:
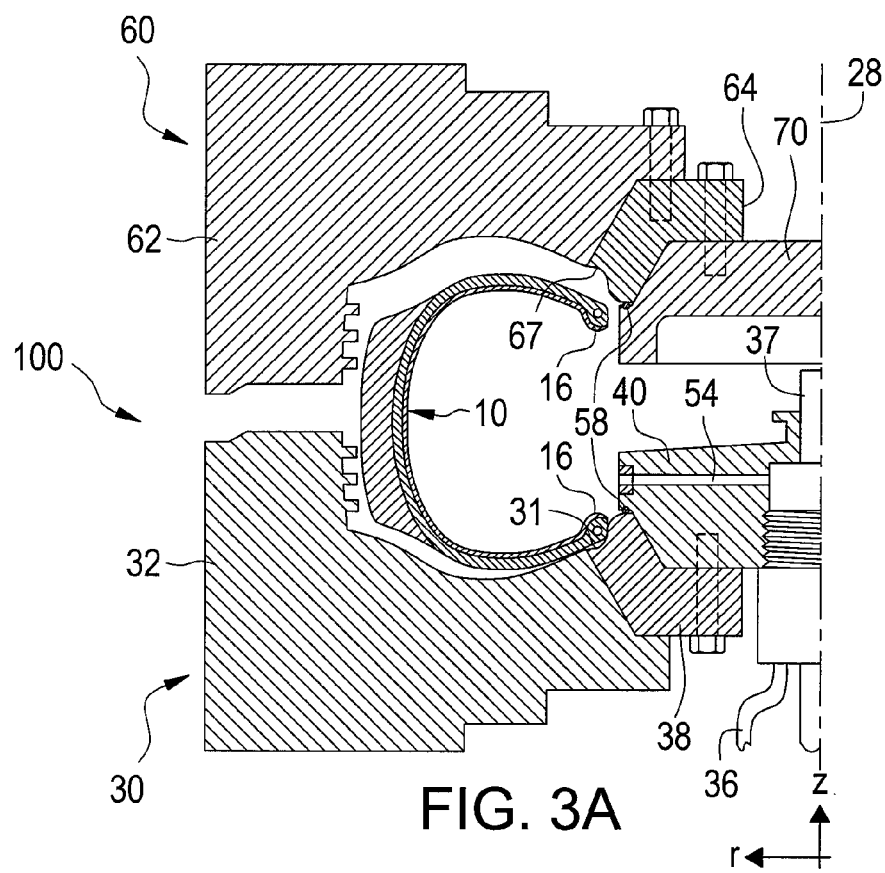
FIG. 3A is a partial cross section of the system shown in FIG. 1 when the green tire is partially engaged with both the bottom assembly and top assembly of the apparatus.
Figure 3B:
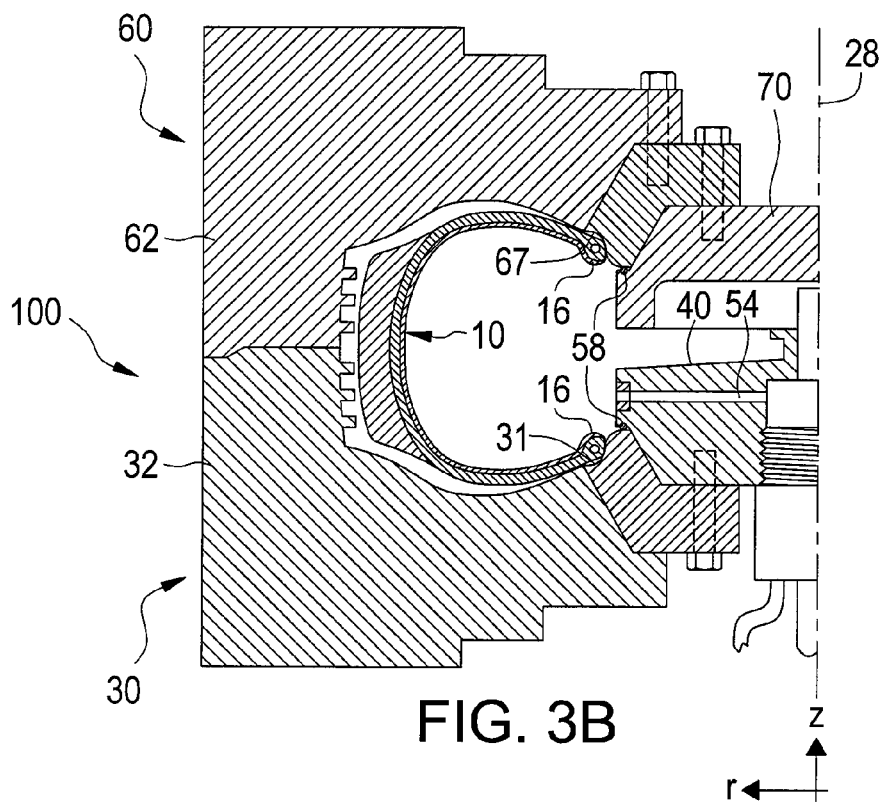
FIG. 3B is a partial cross section of the system shown in FIG. 1 when the green tire is fully engaged with both the bottom assembly and top assembly of the apparatus.
Figure 4:
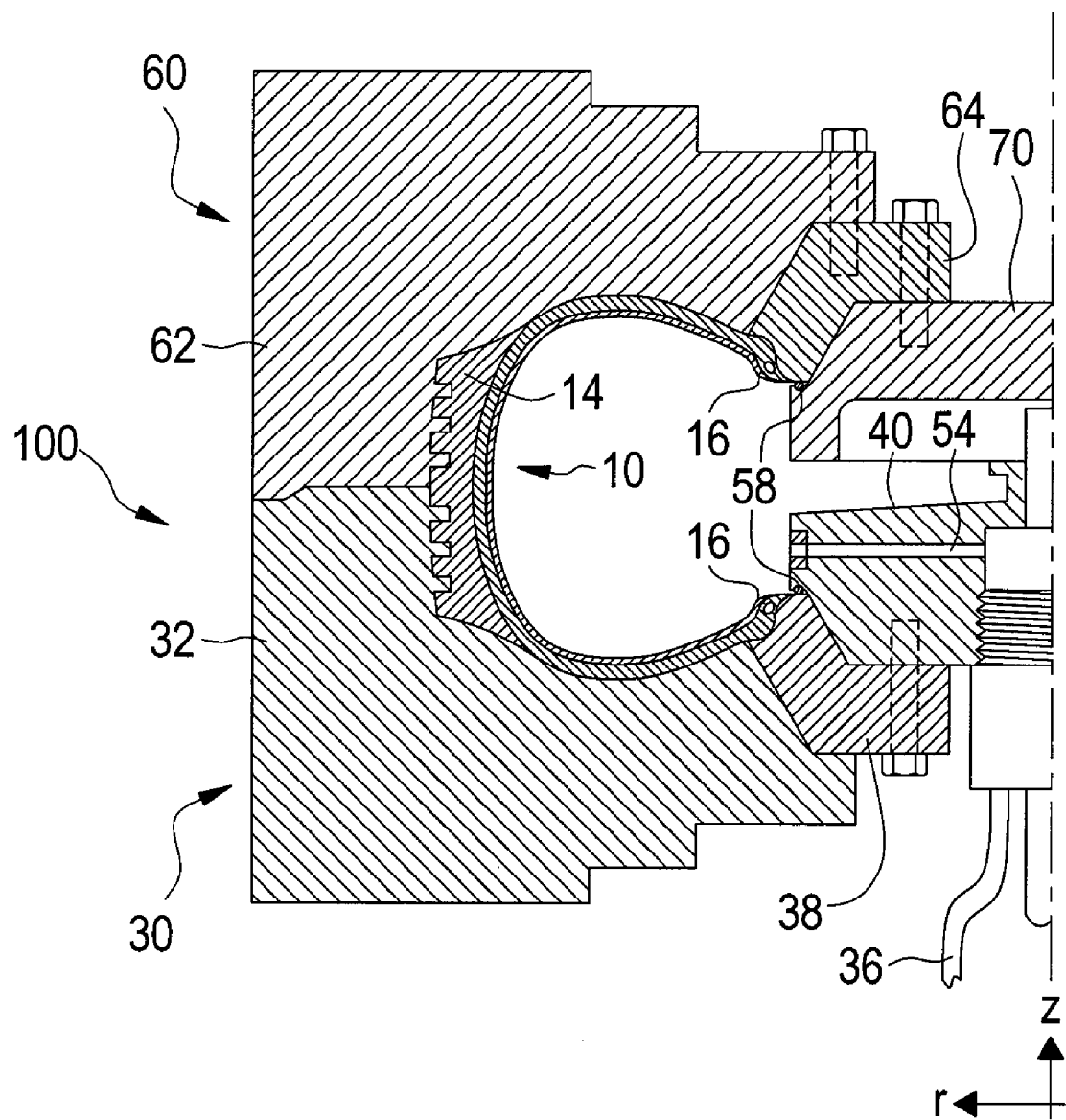
FIG. 4 is a partial cross section of the system shown in FIG. 1 where the green tire is fully engaged with both the bottom assembly and top assembly and a curing medium has forced the green tire against tread section of the tire mold.
Figure 12:
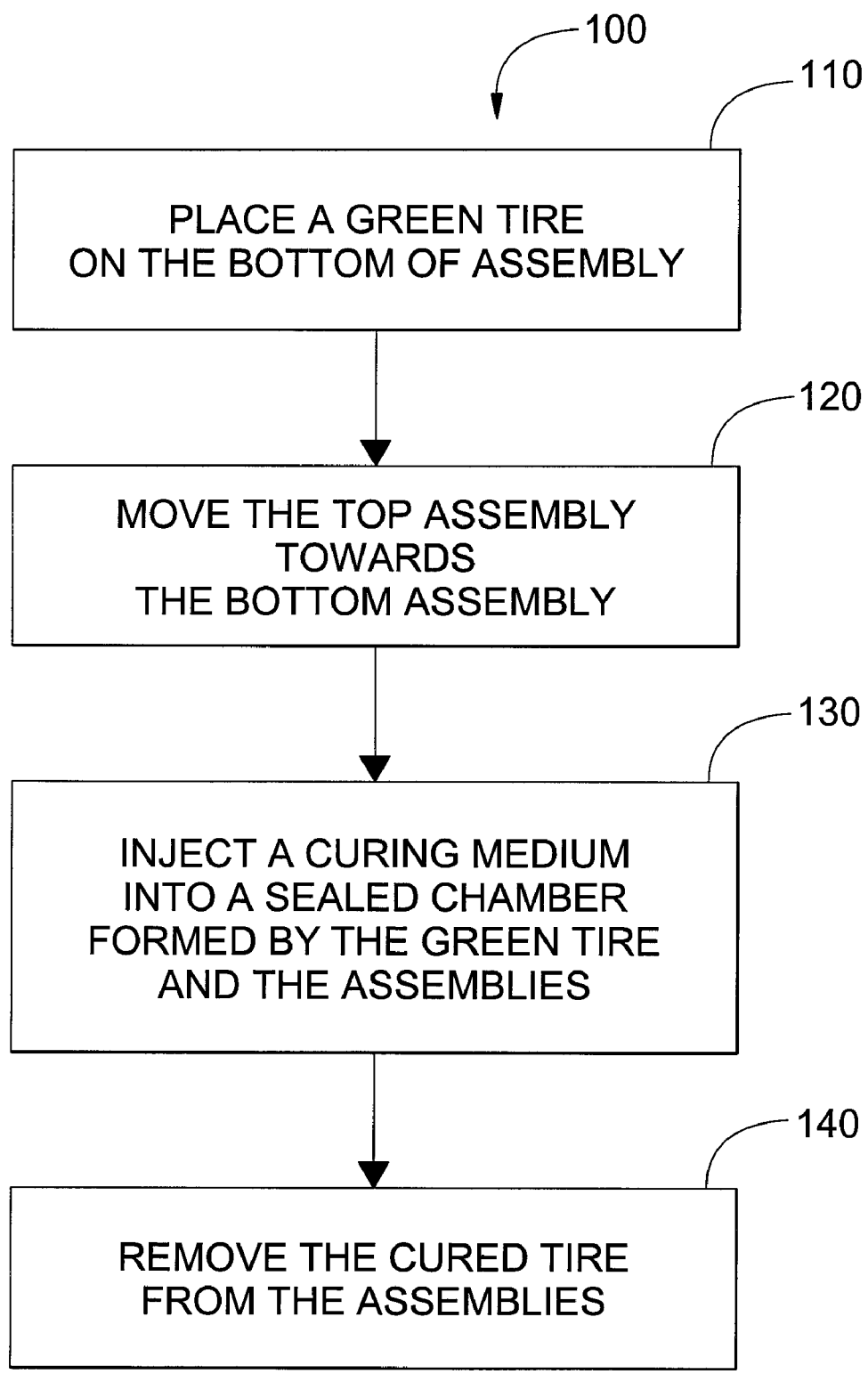
FIG. 12 is a flow chart illustrating an method for curing a tire.

An exemplary curing method or process provided by the curing system 100 can best be understood by viewing FIGS. 2 thru 4. A flow chart 100 of the method is shown in FIG. 12. FIG. 2 illustrates the green tire 10 after a tire press loader (a conventional part of a tire press for loading tires into presses) has positioned and placed (step 110) the green tire 10 over the bottom ring assembly 40 so that one bead 16 of the green tire 10, the bottom bead as shown in FIG. 2, is resting on the curved surface 39 (FIG. 5) of the bottom ring assembly 38 near the O-ring 58 that forms the seal between the bottom mold ring 38 and the bottom ring assembly 40. The curing system 100 in FIG. 2 is shown in an open position, where there is significant separation between the bottom assembly 30 and the top assembly 60. As shown in FIG. 2 the tread 14 of the green tire 10 is not in contact with the tread groves of the bottom mold half 32.

After the green tire 10 is position as seen in FIG. 2, the top assembly 60 is lowered or moved (step 120) to a partially closed position as shown in FIG. 3A. As seen in FIG. 3A, the green tire 10 is partially engaged with the bottom assembly 30 as illustrated by the space therebetween. When in the partially closed position, steam or another curing medium is injected (egresses) into the green tire 10 (step 130) through the steam ports 54 in the bottom ring assembly 40. The initial injection of steam has a radial component so that the steam is not directed towards the bead 16. The steam injection causes the green tire 10 to expand so that the beads form a seal as they are pushed against the curved surface 39 of the bottom mold ring 38 and the curved surface 67 (FIG. 7) of the top mold ring 60.

After a desired amount of time, the top assembly 60 is further lowered to a closed position as illustrated in FIG. 3B. Steam continues to enter the sealed cavity formed by the interior of the green tire 10, the top assembly 60 and the bottom assembly 30. The pressure of the steam forces the tread 14 outwardly towards the tread pattern in the bottom mold half 32 and the top mold 62 as shown in FIG. 4. The top assembly 60 and bottom assembly 30 remain in the closed position of FIG. 4 for a desired cure time. The desired cure time depends on parameters of the green tire 10 and the process, such as, for example, the dimensions of the tire, the thickness and type of material, the temperature of the curing medium and the temperature of both the top assembly 60 and bottom assembly 30. Methods for determining the desired cure times, in general, are well known to those skilled in the art. After the green tire 10 is cured, the cured tire is removed (step 140) from the curing system 100 so that another green tire 10 may be inserted for curing. The cured tire may continue for further processing before becoming a finished tire.

The removal of the cured tire is performed via several steps. In this regard, the top assembly 60 is moved upward in the z-direction. As the top assembly 60 is moved upward, the cured tire remains attached to the bottom assembly 30. In order to remove the cured tire from the bottom assembly 30, the center post 34 is moved upward, and a conventional roller rack (not shown) comes under the cured tie, clearing the tire, and then raises (the z-direction) the cured tire as the center post 34 lowers, thereby freeing the cured tire. As roller rack tilts, the cured tire is ejected out of the back of the press. Another green tire 10 is then automatically loaded back into the press and the curing steps are repeated.

The exemplary tire curing system 100 described above has several advantages over conventional curing systems that use a bladder. In this regard, the maintenance cost, in time and materials, is reduced. Bladder curing systems typically have a conventional top ring assembly and a conventional bottom ring assembly that are at least as expensive to produce as the assemblies of the disclosed system 100. In addition, the disclosed system 100 does not require the undesirable step of forcing bladder beads (not shown) into clamping mechanisms and then bolting (tightening a nut on a bolt) the mechanisms to form a seal. The repeated bolting and unbolting of clamping mechanisms required for changing bladders often results in stripped threads, broken bolts, and related problems. Such problems do not occur for the bladderless system 100. In addition, bladders must be produced in advance and stored thereby resulting in an inventory cost, in order to quickly replace failed or old bladders. The disclosed system 100 also reduces production problems related to bladder break-in shaping as is well understood by those in the art. Further, bladders have the undesirable characteristic of requiring a high-pressure curing medium during their initial use and a low-pressure curing medium during their final use. Such undesirable variations in the pressure of the curing medium is not necessary for the bladderless system 100. The reduction in downtime provided by the disclosed system 100 provides for higher productivity of tire presses and results in savings in production costs In addition, the tire curing system 100 can reduce curing time by up to about 20% or more, thereby increasing the efficiency of a tire press. Further, the curing system 100 of the present disclosure eliminates scrap tires that are undesirably produced by bladder curing systems. Scrap tires are produced in bladder systems because of bladder curing process defects and troubles such as, for example, overshaping, undershaping, bladder buckling, air trapping between the inside of a tire and a bladder, bead misshaping, lining cement contamination, leaking bladders, undesirable bladder to tire adherence, and other well known problems.

Figure 5:
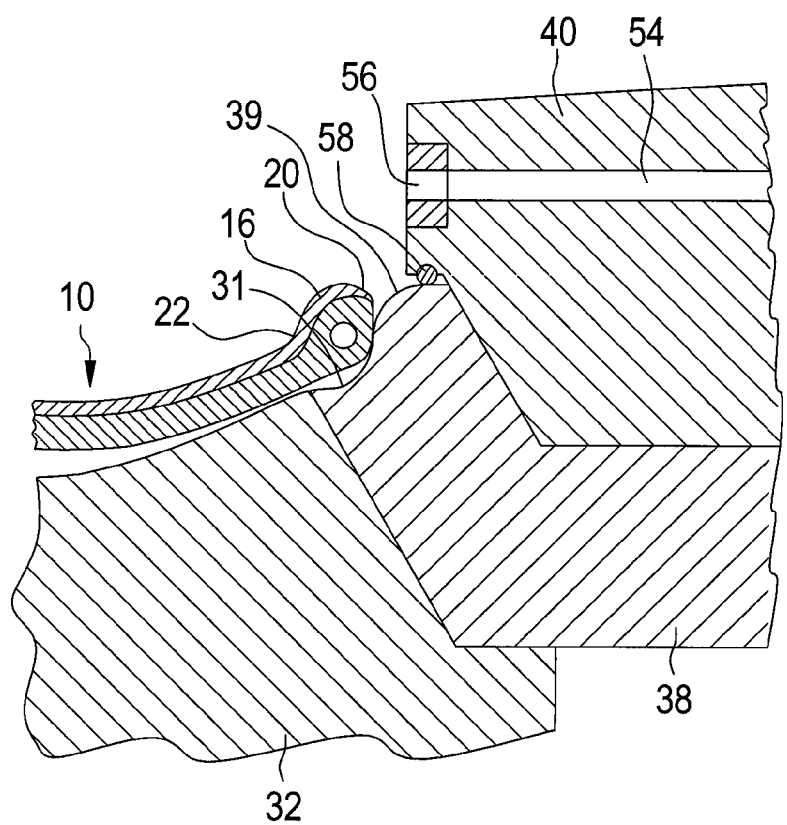
FIG. 5 illustrates the bead section of the green tire as it moves toward the lower mold ring for the assembly of FIG. 1.
Figure 6:
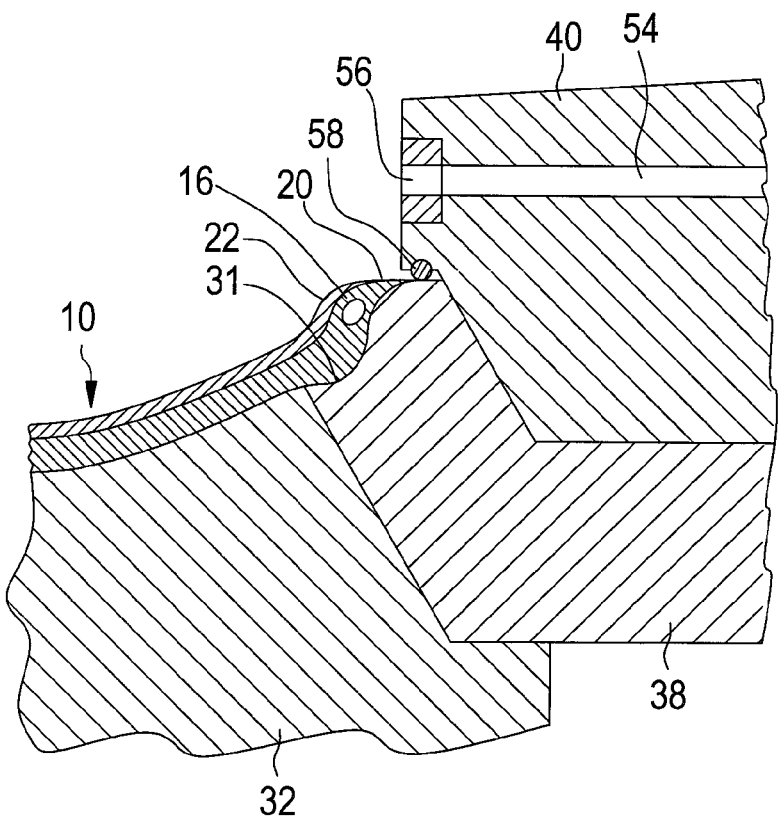
FIG. 6 illustrates the bead section of the green tire next to the bottom assembly of FIG. 1 at the beginning of the curing process and as a curing medium is injected into the tire assembly.

Details of the sealing arrangement provided at the juncture of the side surface of bottom ring assembly 40 and upper portion of the curved surface 39 of the bottom mold ring 38 are shown in FIG. 5. The curved surface 39 of the bottom mold ring 30 has a circumferential groove 31 for receiving the bottom bead 16 of the green tire 10. The tire loader places the green tire 10 over the top edges of the bottom ring assembly 40. The bead 16 of the green tire 10 preferably has a round shape, although other shapes are possible. The thickness of the uncured rubber at the heel 22 of the bead 16 and at the toe 20 of the bead 16 is about the same. As a curing medium, such as steam, pushes and stretches the green tire 10, the bead 16 is pressed into the circumferential groove 31 of the bottom mold ring 38 and the toe 20 of the bead 16 is pressed into a wedge having a generally triangular shape where the point of the wedge is directed towards the O-ring 58. FIG. 6 shows the bead 16 of a cured tire, i.e., when the curing process is complete. The surface area between the toe 20 of the bead and the heel of the bead 22 is somewhat flatted and no longer has the round shape as shown in FIG. 5.

Figure 7:
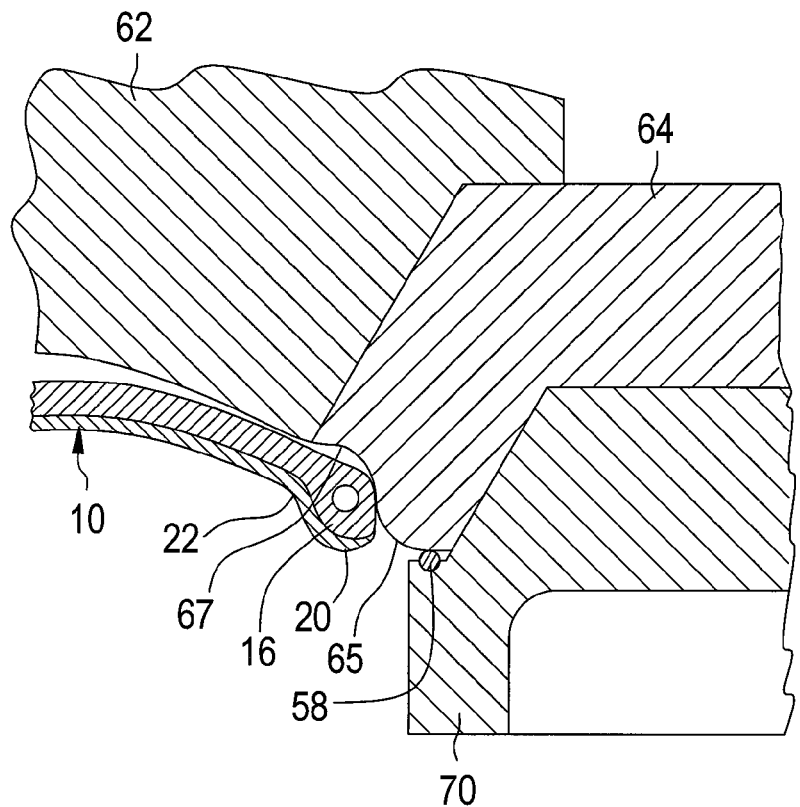
FIG. 7 illustrates the bead section of the green tire next to the top assembly of FIG. 1 at the beginning of the curing process and as a curing medium is injected into the tire assembly.
Figure 8:
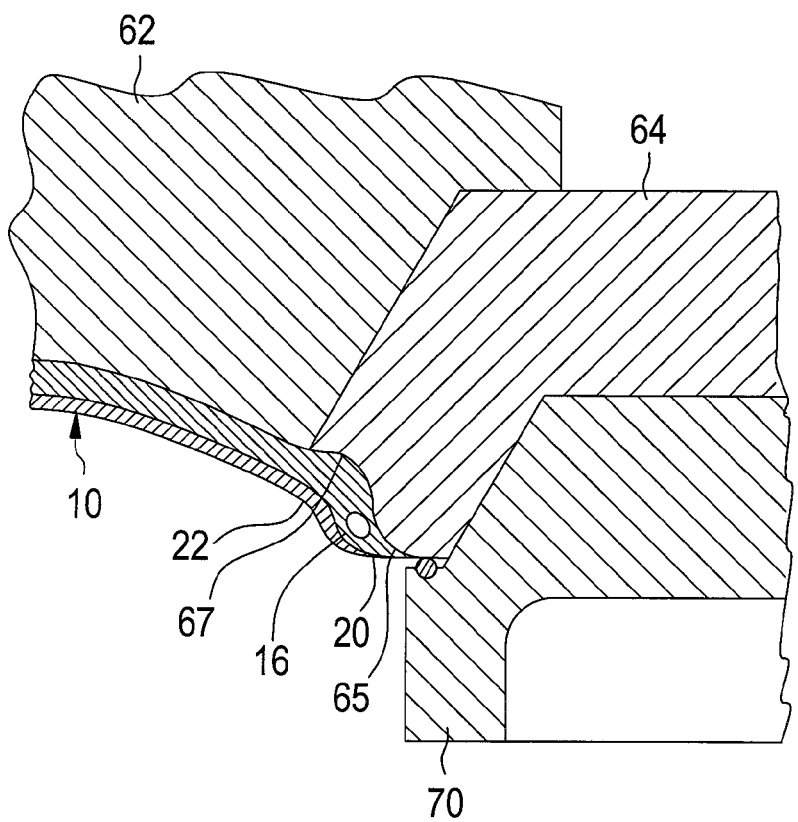
FIG. 8 illustrates the bead section of the green tire of FIG. 7 when the curing process is completed.

FIG. 7 shows the top bead 16 of the green tire 10 when the top assembly 60 is lowered to the partially closed position as shown in FIG. 3A. The curved surface 65 of the top mold ring 60 has a circumferential groove 67 for receiving the top bead 16 of the green tire 10. As injected steam from the steam ports 54 enters the interior of the green tire 10, the upper bead 16 is pressed towards and into the groove 67 of the top mold ring 64. As the curing process proceeds and toe 20 of the bead is reshaped into a wedge having a triangular shape as shown in FIG. 8. The pointed end of the wedge is directed towards the O-ring 58 and helps provide an upper seal for containing the steam used for curing the green tire 10. The area of rubber between the heel 22 of the bead and the toe 20 of the bead is flatted somewhat as shown in FIG. 8.

Figure 9:
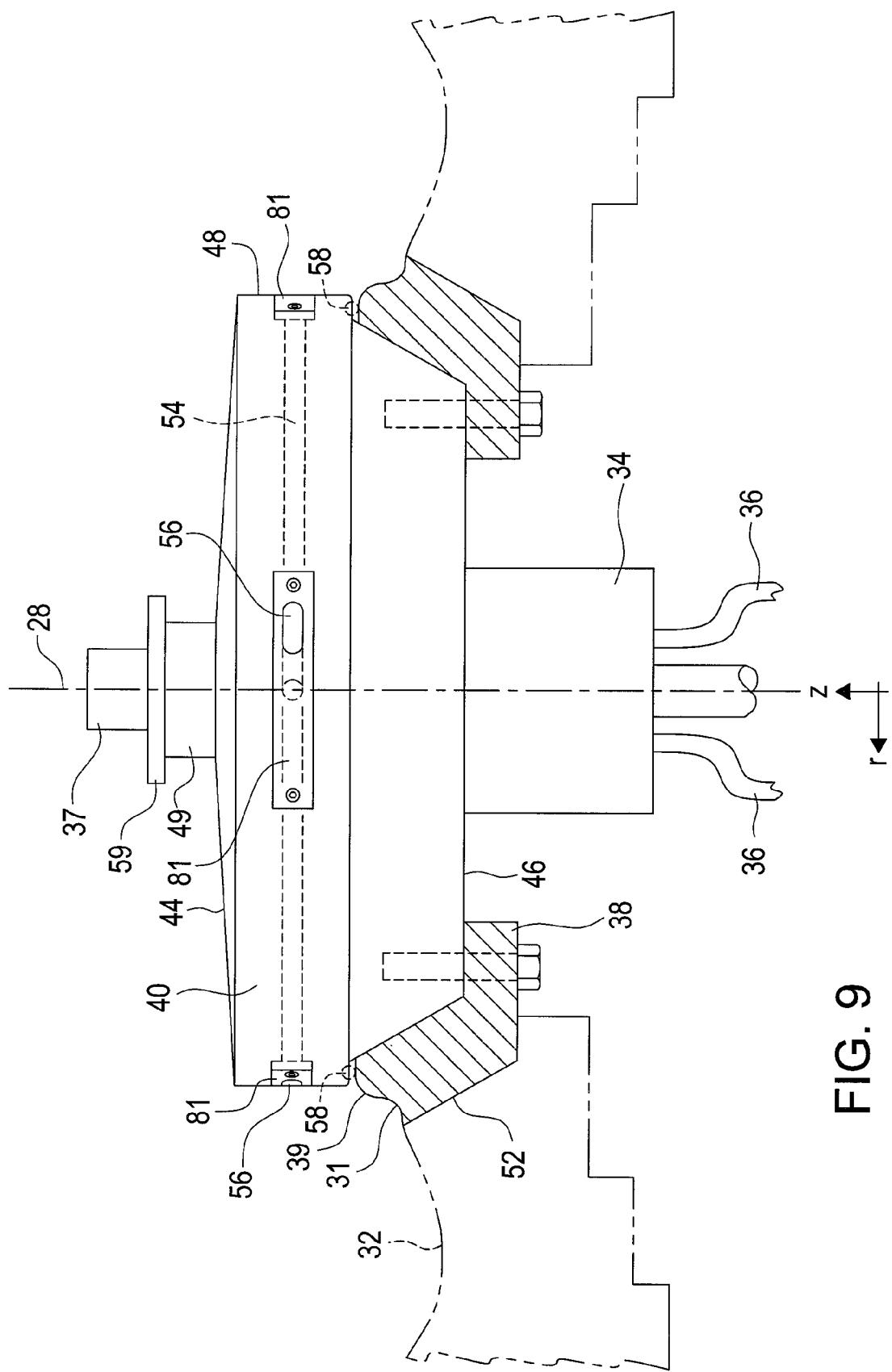
FIG. 9 illustrates details of the bottom assembly of FIG. 1.

An embodiment of the bottom ring assembly 40 is illustrated in detail in FIG. 9. Bolts are shown attaching the bottom mold ring 38 to bottom ring assembly 40. The O-ring 58 is shown positioned within a groove on the side surface 48 of the bottom ring assembly 40. The taper of the upper surface 44 is shown going in the negative z-direction as the surface extends in the redirection. Hence the angle measure between vertical (in the positive z-direction) and the upper surface 44 is greater than ninety degrees. A flange 59 on top of a cylinder 49 is dimensioned to receive the inner post for clamping the bottom ring assembly 40 to the inner post 37. A traditional clamp (not shown) comprises two half-cylinders with flanges and bolt holes and is bolted about the cylinder for securing the bottom ring assembly 40 to the inner post 37. Steam ports 54 are shown extending radially and receive steam from steam lines 36. Angular slots 56 in deflector plate 81 on the outer surface of the bottom ring assembly 40 direct steam in a circumferential direction. The angular slots are shown more clearly in FIG. 11. Steam is directed in the circumferential direction to minimize damage to lap joints of the inner liner material of the green tire 10 and also to limit an initial outward push on the tread area of the green tire 10. The ejection angle for steam in one embodiment is around 15 degrees, where the ejection angle is measured radially from a tangent extending from edge of the bottom ring assembly 50. The ejection angle is a design consideration and may have a variety of values that are dependent on factors such as the curing medium temperature and pressure, the dimensions of the green tire, and other characteristics.

Figure 10:
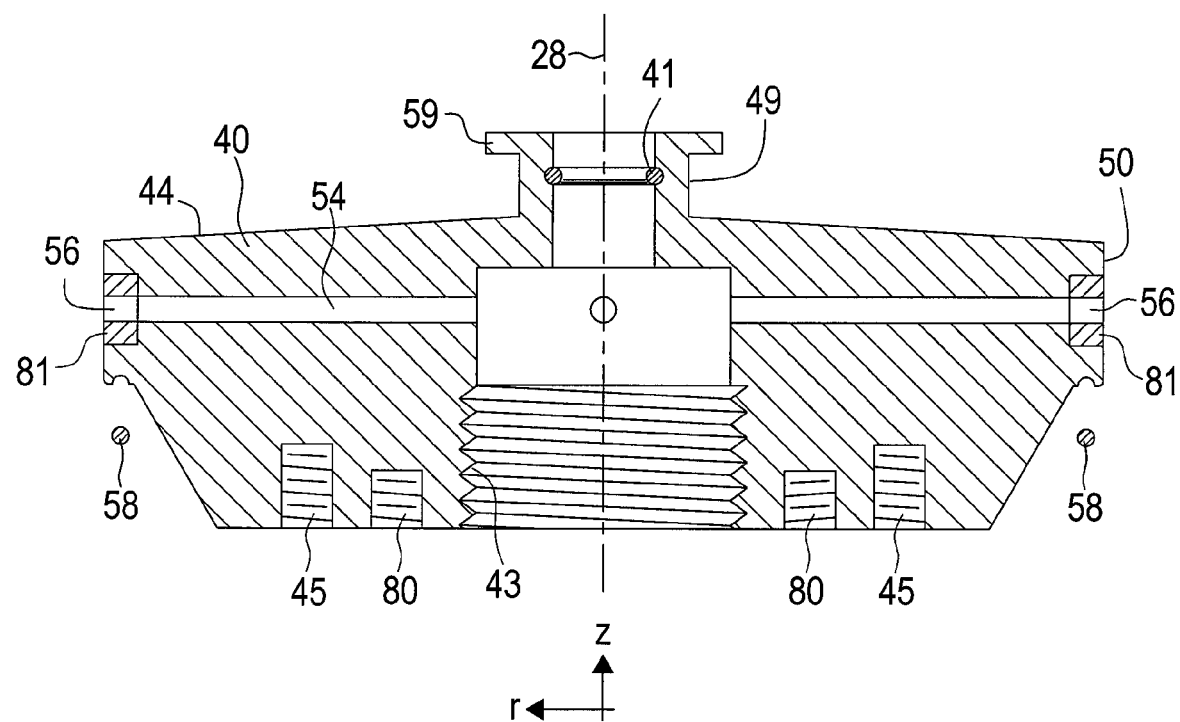
FIG. 10 is a cross section of the bottom ring assembly of FIG. 9.

FIG. 10. is a cross section of the bottom ring assembly 50 showing the threaded holes 45 for receiving the bolts that extend through the bottom mold ring 38. More detail is also provided for the coupling of the bottom assembly 40 to the inner post 37. An inner post O-ring 41, snapped within a groove on the inside a cylinder 49 of the bottom ring assembly 50, forms a seal between the inner post 37 and the bottom ring assembly. The coupling flange 47 on top of the cylinder 49 keeps a clamp (not shown) from slipping off of the cylinder 49. The threads 43 used to couple the bottom ring assembly 40 to a conventional center post 34 is also illustrated. In addition to the coupling threaded holes 45, second threaded holes 80 are provided to assist technicians or other workers install the bottom assembly 40 to the conventional center post 34.

The angular slot 56 for directing the steam in a circumferential direction is illustrated in FIG. 11. An angular slot assembly 81 is bolted to the bottom assembly 40 and serves as a directional device for steam flow. The angle for steam flow is shown to be around fifteen degrees when measured from the tangent at the point of connection. Various angles may be selected to meet the needs of a particular green tire 10. In one embodiment as shown, there are four steam ports 54. In other embodiments, a different number of ports may be desirable. It is expected that the number of desired ports may be between two and around twelve, although numbers outside of this range are possible.

One of the reasons for the directional angle of the slots 56 is so that the steam from the slots 56 travels a greater distance before impacting the inner liner 12 and impacts the inner liner 12 less directly relative to an embodiment in which the slots 56 are not angled. In this regard, if the slots are not angled, then the steam would strike the inner liner 12 directly (i.e., at about a 90 degree angle). Moreover, in such an embodiment, the steam impacts the inner liner 12 with greater pressure, and the steam impacting the inner liner 12 close to the seam 19 has a greater chance of breaking or rupturing the seam 19, which is often held together by an adhesive material. Angling the slots 56, as shown, may help to reduce the pressure applied to the inner liner 12 and, therefore, help to keep the seam 19 in tact. Other angles for the slots 56 are possible, and increasing the number of slots 56 may help to reduce the pressure applied to the inner liner 12 at the area of the seam 19. In addition, other techniques for helping to lower the pressure applied to the inner liner 12 and, in particular, at the area close the seam 19 are possible.

Figure 13:
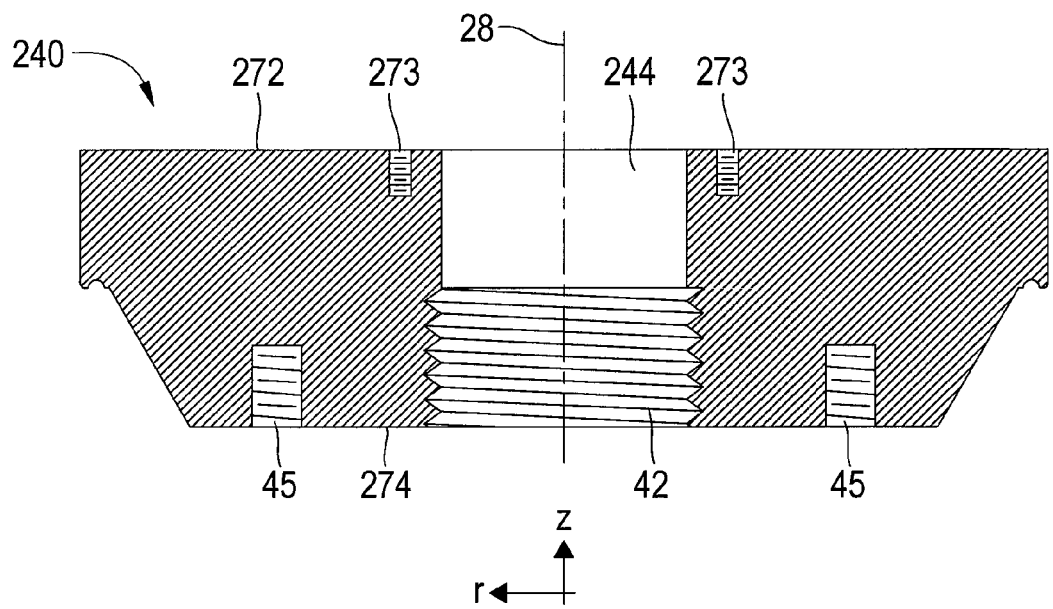
FIG. 13 depicts an exemplary embodiment of a bottom ring assembly for a tire curing system.

FIG. 13 shows a cross section of an exemplary embodiment of a bottom ring assembly 240. The bottom ring assembly 240 has threaded coupling holes 45 extending upward, the z-direction, from a bottom surface 274. The coupling holes 45 are spaced for mounting the bottom ring assembly 240 to the bottom ring mold 38 as depicted in FIG. 1. A top surface 272 of the bottom ring assembly 240 has threaded holes 273 extending downward, the negative z-direction, from the top surface 272 and into the bottom ring assembly 240. In one embodiment, there are four threaded holes 273 angularly spaced at 90 degrees and at the same distance from center line 28. Other locations for threaded holes 273 are possible in other embodiments. The threaded holes 273 are located for receiving bolts (not shown) for coupling components of the curing system 100 to the bottom ring assembly 240. Bottom ring assembly 240 has an circular opening 244 for receiving a conventional center post 34.

Figure 14:
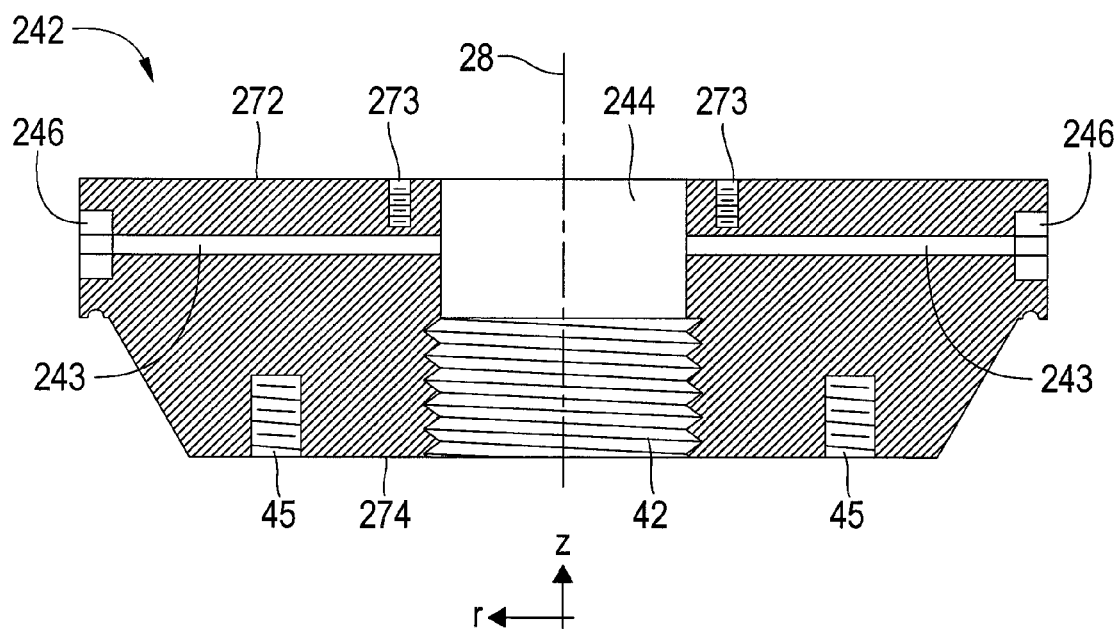
FIG. 14 depicts an exemplary embodiment of a bottom ring assembly having a vacuum port.

FIG. 14 depicts a cross section of an embodiment of a bottom ring assembly 242 having a structure similar to the bottom ring assembly 240. However, bottom ring assembly 242 has vacuum ports 243 extending from a center opening 244 of the bottom ring assembly 242. At the distal end of each vacuum port 243 is a check value 246. The check value 246 blocks steam or other curing compounds from flowing outward through the vacuum ports 243 during the steam injection phase of the curing process. In one embodiment, there are four vacuum ports 243. In other embodiments, other numbers of vacuum ports are possible. After the green tire 10 has been cured, a vacuum is applied to the proximal end of each vacuum port 243. The applied vacuum causes check value 246 to open thereby providing a path for an inward flow of water and steam from the interior of the vulcanized tire. The applied vacuum is supplied through center post 34 using a conventional vacuum system and vacuum lines.

Bottom ring assembly 242 and bottom ring assembly 240 serve as a support structure for a steam injection cap configured for dispersing steam. Steam is dispersed from the steam cap into the cavity formed by the interior of green tire 10 and components of the system 100 as depicted in FIG. 4. For example, an embodiment comprising the combination of ring assembly 242 and a steam cap may replace the bottom ring assembly 40 for bladderless curing system 100.

Figure 15A:
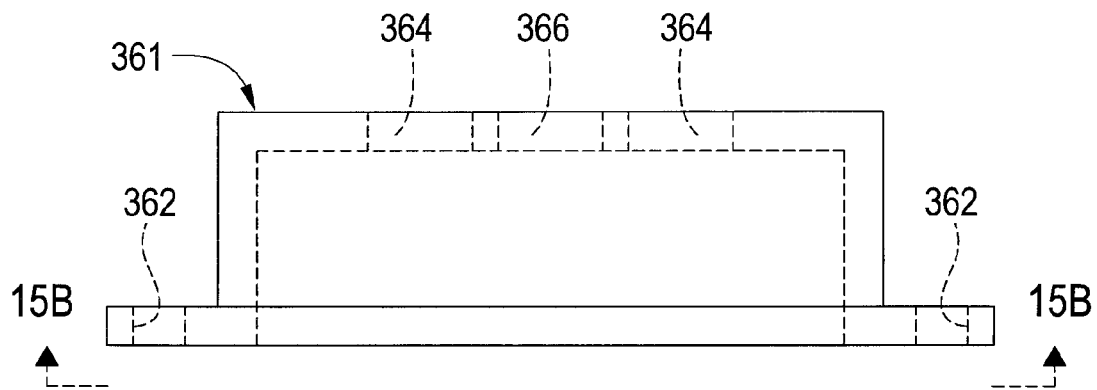
FIGS. 15A-D depict an exemplary embodiment of a steam dispersion system for the bottom assembly of FIG. 14.
Figure 15B:
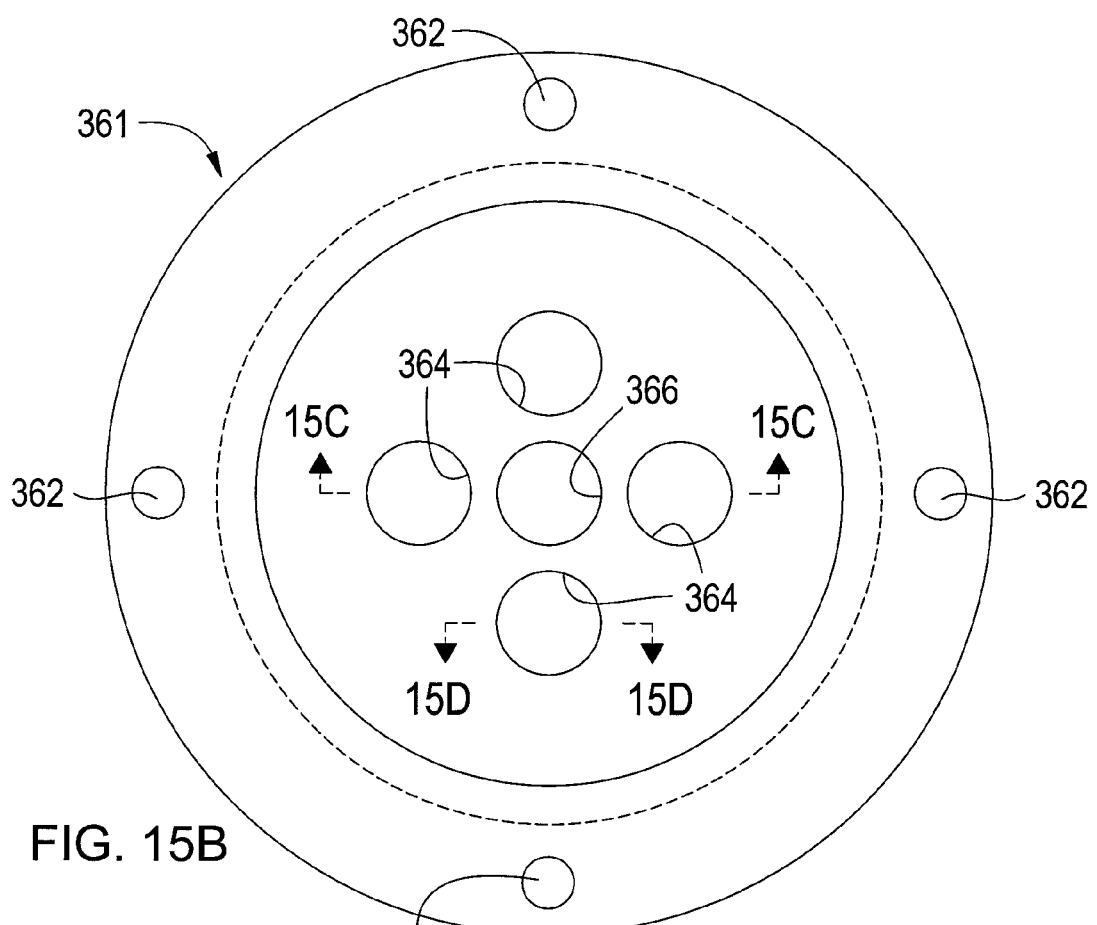
Figure 15C:
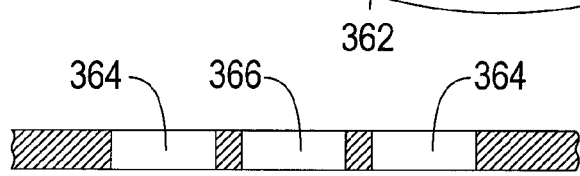
Figure 15D:
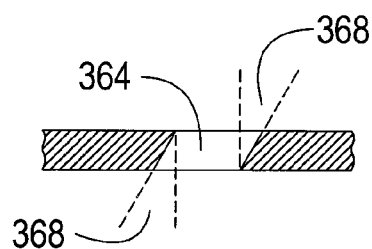

In one exemplary embodiment of tire curing system 100, a vertical port cap 361 (a steam injecting cap) as depicted in FIGS. 15A-D is coupled to the bottom ring assembly 242. A side view of the vertical port cap is depicted in FIG. 15A. Steam ports 364 are located radially about a center port 366 and are in the top portion of the vertical port cap 361. A bottom view of the vertical port cap 361, depicted in FIG. 15B, shows exemplary locations of the steam ports 364, 366. FIG. 15B further shows mounting holes 362 that are positioned to align with the threaded holes 273 in the bottom ring assembly 242. When the mounting holes 362 are aligned with the threaded holes 273, bolts (not shown) couple the vertical port cap 361 to the bottom ring assembly 242. FIG. 15C is a cross-sectional view of the top portion of the vertical port cap 361. For one embodiment, the steam ports 364 have angular sides as depicted by directional angle 368 in FIG. 15D. The directional angle 368 provides the exiting steam with both a vertical and a horizontal component thereby controlling the flow direction of injected steam. A variety of steam flow patterns is available by varying the directional angle 368 and the number of steam ports in the vertical port cap 361. Variations in the number, location and size of the steam ports for the vertical port cap 361 are possible.

Figure 16:
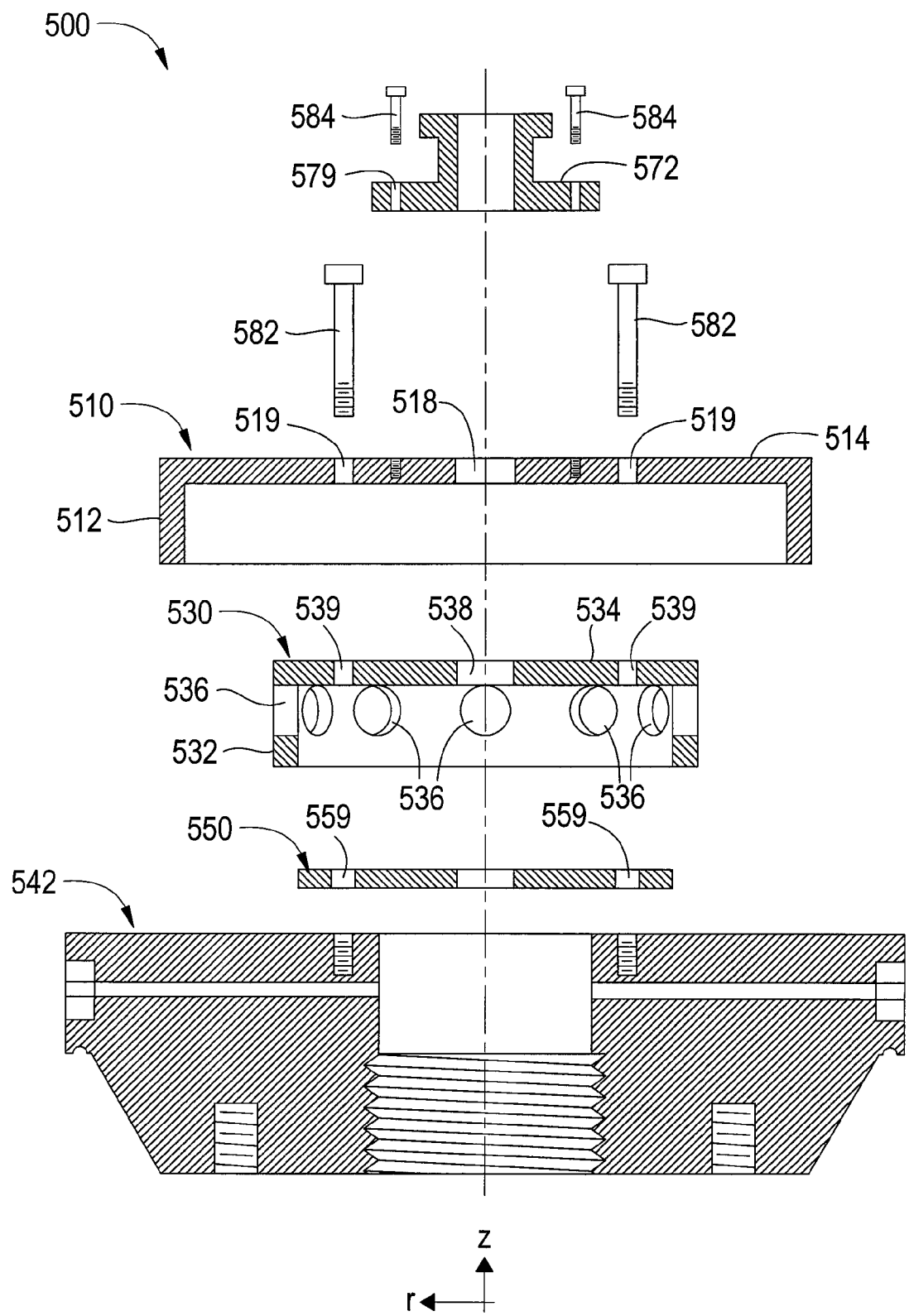
FIG. 16 depicts a cross section an exemplary embodiment of an unassembled steam dispersion system for the bottom assembly of FIG. 14.

FIG. 16 depicts an embodiment, unassembled, of a steam-diverting cap 500. When the steam-diverting cap 500 is assembled and mounted to bottom ring assembly 240 or 242 there is a reduction in the impact of steam on the interior surfaces of the green tire 10. The steam-diverting cap 500 comprises a diverter 510 and a horizontal port cap 530. The horizontal port cap 530 is cup-shaped, shown as upside down cup in FIG. 15. The horizontal port cap 530 has a cylindrical-shaped vertical wall 532 and a disk-shaped horizontal wall 534. Holes 536 in vertical wall 532 serve as horizontal ports for injecting steam or other curing medium into the cavity formed by the interior of the green tire 10 and the system 100. In one embodiment, a clearance hole 538 in the center of the horizontal wall 534 accommodates the inner post 37 of a center post press. Other embodiments may not have the clearance hole 538. Attachment holes 539 extend through the horizontal wall 534 for receiving coupling bolts that couple the horizontal port cap 530 to threaded holes 273 in the bottom ring assembly 242. The diverter 510 of the steam-diverting cap 500 is cup-shaped and has a cylindrical-shaped diverter vertical wall 512 and a disk-shaped diverter horizontal wall 514. The diverter horizontal wall 514 has a center post clearance hole 518 and attachment holes 519 for coupling the diverter to the bottom ring assembly 242. The interior diameter of the diverter 510 is greater than the exterior diameter of the horizontal port cap 30 so that there is a distance of around an inch between the interior vertical surface of the diverter 510 and the exterior surface of the diverter 510 when the diverter is placed concentrically over the horizontal port cap 530. When the attachment holes 519 and 539 are aligned with the threaded holes 273 of bottom ring assembly 242, bolts 582 attach the steam diverting cap 500 to the bottom ring assembly 242. In one embodiment, a clamp cover 572 is coupled to the top surface of the diverter 510.

In one embodiment, the steam diverting cap 500 further has a vacuum block plate 550. The vacuum block plate 550 is disc-shaped with a diameter smaller than the inside diameter of the horizontal port cap 530, although other shapes of the plate 550 are possible in other embodiments. There are bolt holes 559 in the vacuum block plate 550 positioned consistent with the bolt pattern on the bottom ring assembly 242. The vacuum block plate 550 is dimensioned to slide upward (the z-direction) or downward (the minus z direction) the bolts 582 and within cap 530 when bolts are coupled to threaded holes 273. The vacuum block plate 550 is pushed upward when steam is injected from steam lines in the center post 37 and is pulled downward when a vacuum is applied.

Figure 17A:
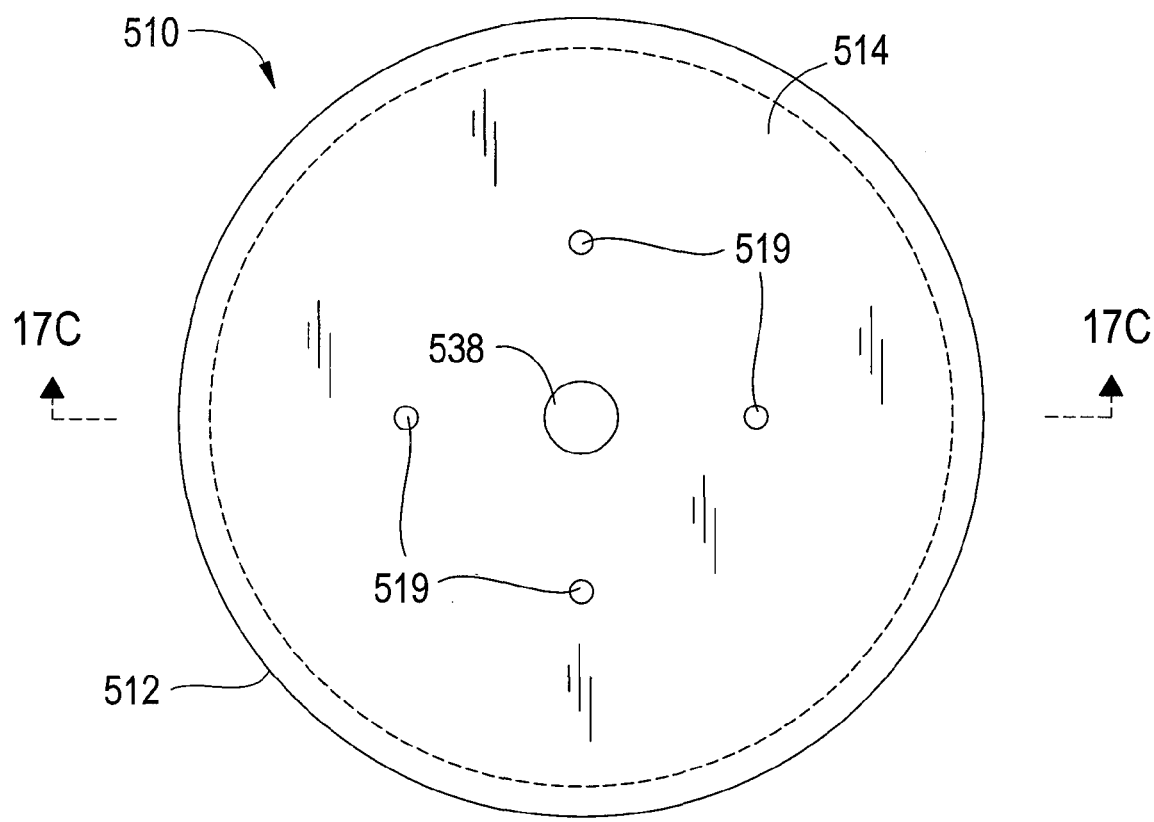
FIGS. 17A-C depict a component of the embodiment depicted by FIG. 16.
Figure 17B:
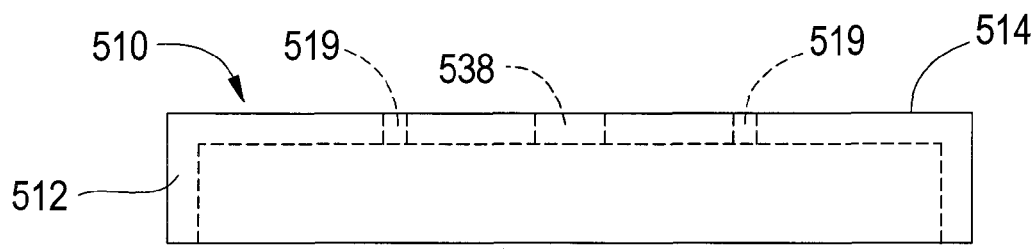
Figure 17C:
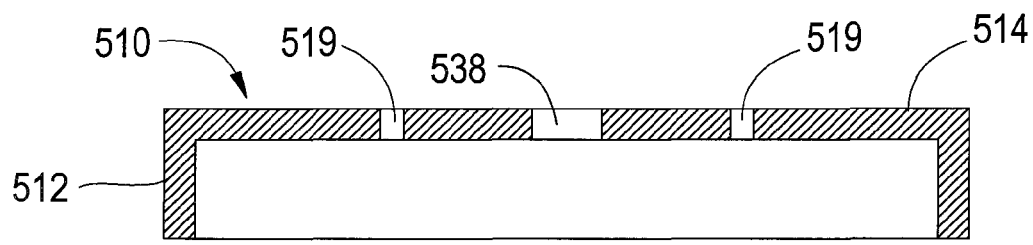

Details of the diverter 510 are shown in FIG. 17A-C. The top view, FIG. 17A, shows the diverter 510 having a circular shape, although other shapes for the diverter 510 are possible in other embodiments. The horizontal wall 514 and the vertical wall 512 are shown in FIGS. 17B-C.

Figure 18A:
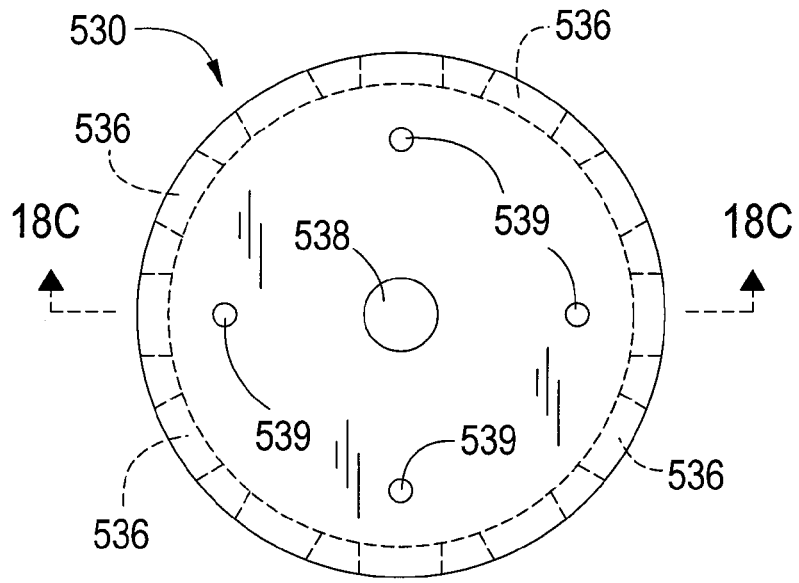
FIGS. 18A-C depict a component of the embodiment depicted by FIG. 16.
Figure 18B:
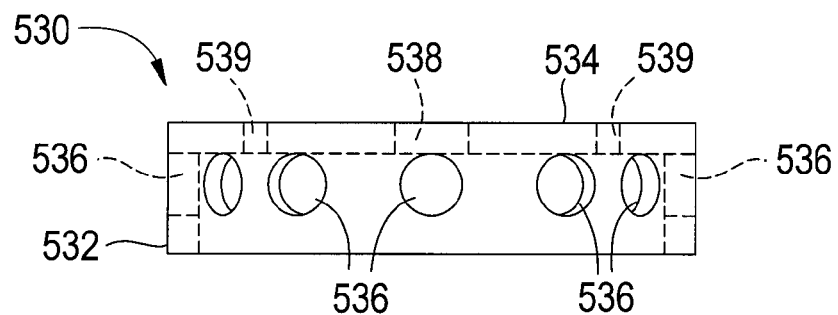
Figure 18C:
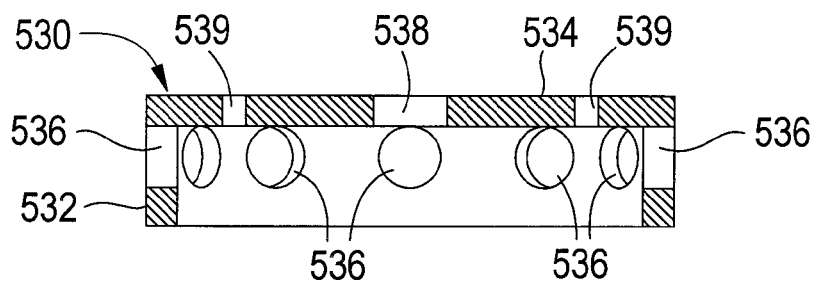

Details of the horizontal port cap 530 are shown in FIG. 18A-C. The top view, FIG. 18A, shows the horizontal port cap 530 having a circular shape. The horizontal wall 534 and the vertical wall 532 are shown in FIGS. 18B-C.

Figure 19A:
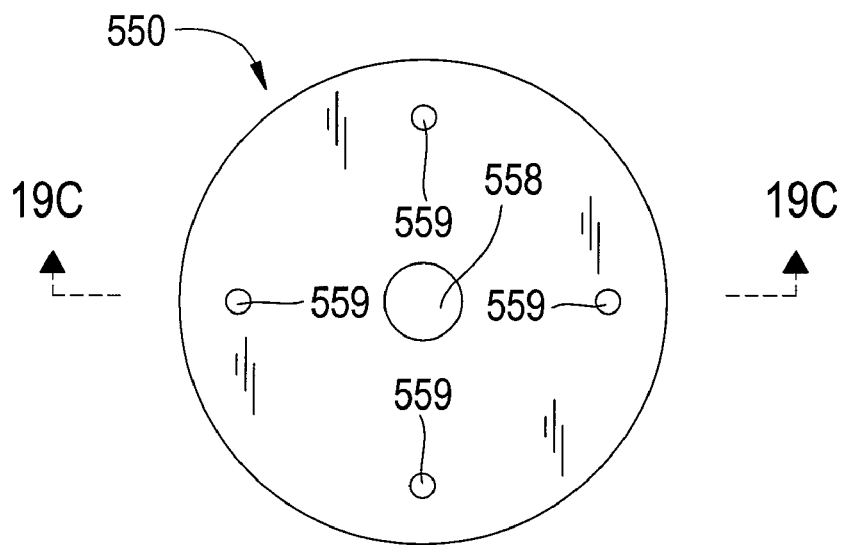
FIGS. 19A-C depict a component of the embodiment depicted by FIG. 16.
Figure 19B:
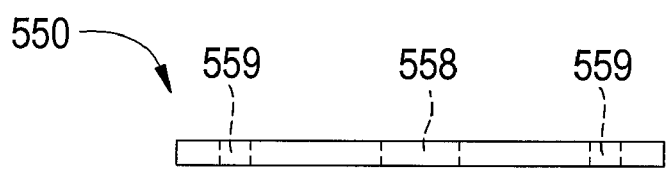
Figure 19C:
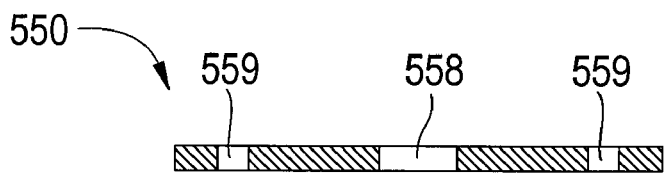

Details of the vacuum block plate 550 are shown in FIG. 19A-C. The top view, FIG. 19A, shows the vacuum block plate 550 having a circular shape, although other shapes of the plate 550 are possible in other embodiments. The slide holes 559 for the vacuum block plate 550 are shown in FIGS. 19B-C.

Figure 20:
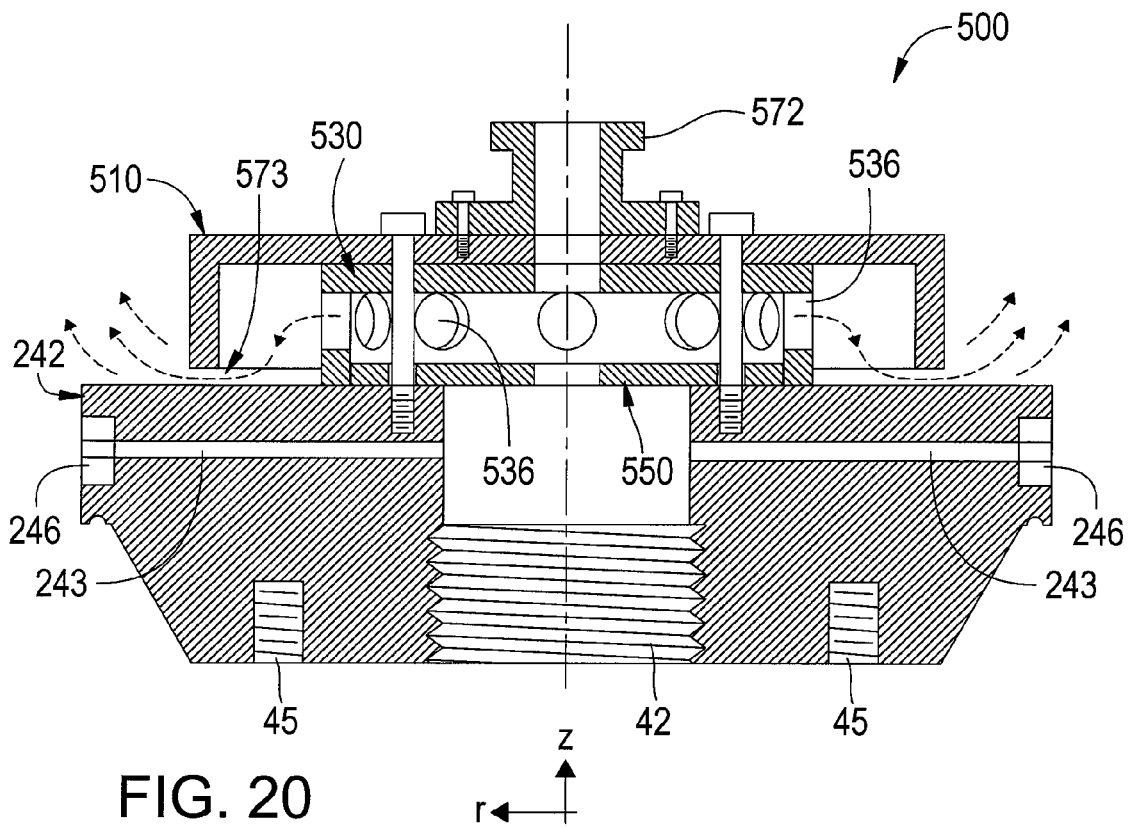
FIG. 20 depicts an exemplary embodiment of a steam dispersion system for the assembly of FIG. 14.

FIG. 20 depicts the steam-diverting cap 500 attached to bottom ring assembly 242 when steam is injected into the green tire 10. The arrows indicate the approximate path of steam flow as the steam flows into the green tire (not shown). Note that the vacuum block plate is forced up, the z-direction, by the flow of steam. When curing time for having steam within the tire has elapsed, the steam source is replaced by a vacuum source. When a vacuum is applied to the bottom ring assembly 242, the vacuum block plate is pulled towards the top surface of the bottom ring assembly so that the vacuum causes the check valves within the bottom ring assembly to pull, via vacuuming, steam, vapor and water from the interior of the green tire 10.

The diverter 510 redirects the flow of steam exiting the holes 536 such that the steam has a vertical (in the z-direction) component to its flow. In this regard, the steam deflects of the surface off of the assembly 242 such that there is vertical components to its flow. As a result, the steam impacts the inner liner 12 of the green tire 10 less directly thereby reducing the pressure applied to the inner liner 12 at various points, particularly an inner liner portion close to the seam 19. In addition, in one exemplary embodiment, the gap 573 between the diverter 510 and the assembly 242 is small enough such that the pressure of the steam helps to force a more vertical movement of the steam exiting through the gap 573. In one exemplary embodiment, the width of the gap (i.e., the distance between diverter 510 and assembly 242 is about one-half of an inch, but other widths are possible in other embodiments.

Furthermore, in an effort to further increase the vertical flow component, the size of the width 573 is sufficiently small such that the pressure of the steam passing through the gap 573 helps to disperse the flow of the steam exiting the gap 573. In this regard, the diverter 510 and upper surface of the assembly 242 form a nozzle that accelerates the steam through the gap 573. As the steam deflects off of the surface 242 and expands after exiting the gap 573, the steam disperses helping to reduce the momentum of the steam striking the inner liner 12 at various points. Indeed, after being diverted down and under the diverter 510, some of the steam may have a circular or turbulent motion or at least have a direction of motion that impedes or counteracts the movement of steam that would otherwise strike the inner liner 12 directly. Further, the flow of the steam is less concentrated or, in other words, dispersed over a greater area thereby reducing the pressure on the inner liner 12 at various points, such as at points close to the seam 19. Accordingly, the pressure applied to the inner liner 12 by the steam is reduced at various points helping to prevent the steam from breaking or rupturing the seam 19.

Figure 21:
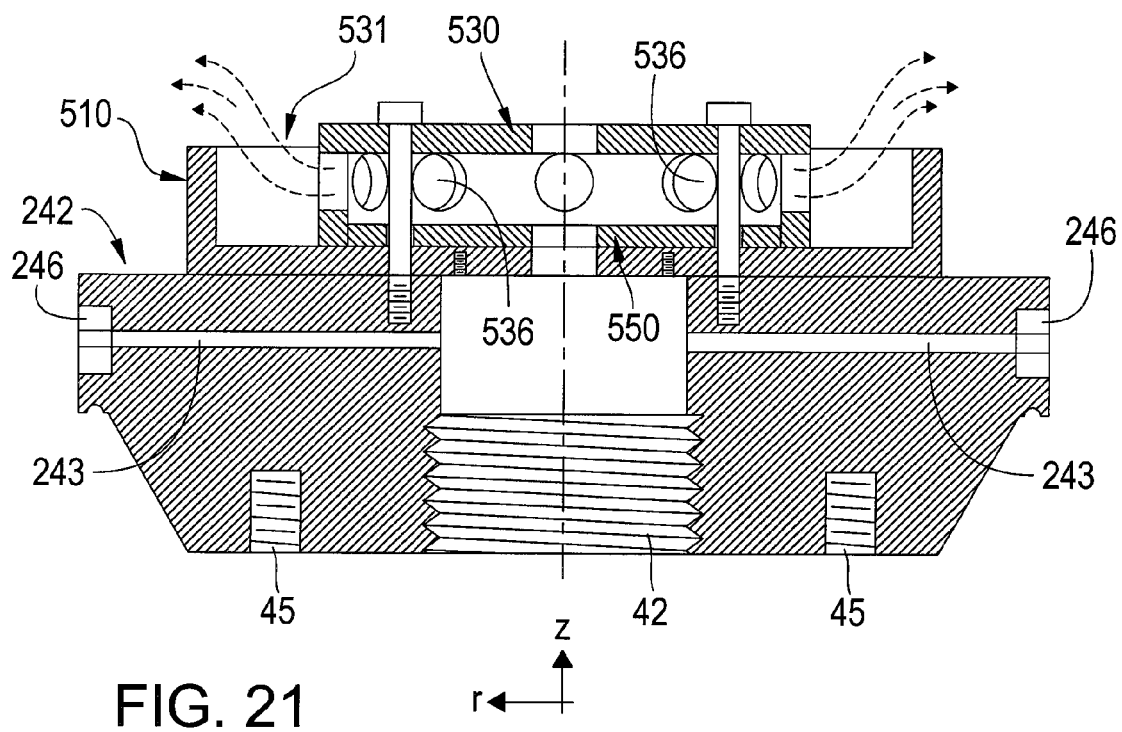
FIG. 21 depicts an exemplary embodiment of a steam dispersion system for the assembly of FIG. 14.

FIG. 21 depicts an embodiment of the steam-diverting cap 500 wherein the diverter 510 has been turned upside down so that the horizontal wall of the diverter is in contact with the top surface of the bottom ring assembly 242. The vacuum block plate functions as described above, but will rest on the interior surface of the diverter 510 when a vacuum is applied. As shown by the motion arrows in FIG. 21, the diverter 510 deflects the steam exiting the holes 536 and introduces a vertical component (in the z-direction) to the motion of the steam. Moreover, by increasing the diameter of the cap 530, it is possible decrease the gap 531 through which the steam flows thereby forming a nozzle that would have a similar effect as the nozzle formed by the diverter 510 and assembly 242 described above for FIG. 20.

Figure 22:
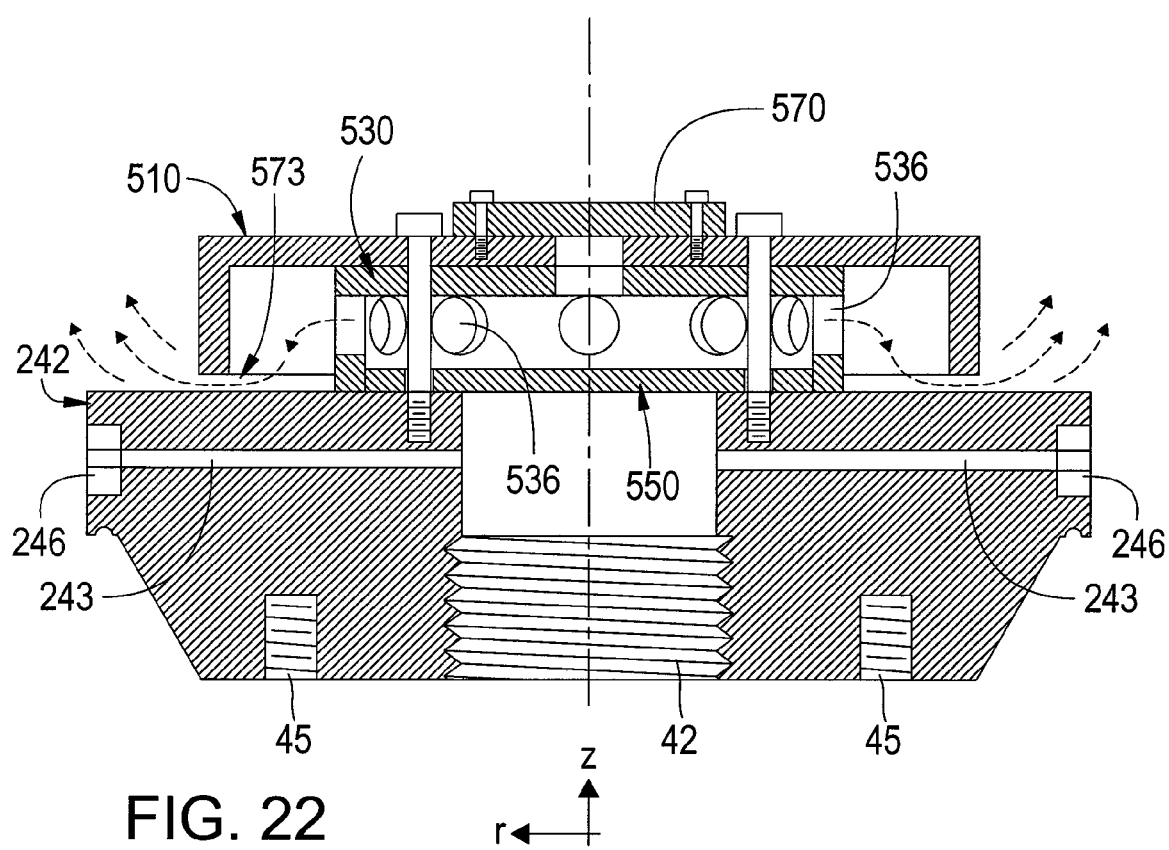
FIG. 22 depicts an exemplary embodiment of a steam dispersion system for the assembly of FIG. 14.

It should be observed that the embodiments shown by FIGS. 20 and 21 are for poles 34 (FIG. 9) that have an inner pole 37 that would extend up through the clamp cover 572. An exemplary configuration for poles 34 that do not have such an inner pole 37 is shown in FIG. 22. In this regard, a flat cover 570 is provided in place of the clamp cover 572. Further, the plate 550 is modified such that it no longer has a hole in its center for receiving the inner pole 37. Moreover, various other modifications in order to fit the steam-diverting cap 500 for other types of presses would be readily apparent to one of ordinary skill in the art.

It should be emphasized that the above-described embodiments of the present disclosures are merely possible examples of implementations set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and protected by the following claims.

Now, therefore, the following is claimed:

1. A bladderless curing system for curing a green tire where the green tire has an interior surface with a liner, comprising: mold rings that are coupled to the green tire forming a sealed cavity defined by the interior surface of the green tire; an injection cap having at least one injection port; and a diverter having a periphery extending around the injection cap and defining a diverter cavity into which a curing medium flows from the injection port, the diverter defining an elongated gap extending along the periphery and through which the curing medium flows from the diverter cavity into the sealed cavity, wherein the diverter is configured to divert the curing medium through the elongated gap such that passage of the curing medium through the elongated gap induces turbulence in a flow of the curing medium causing the curing medium to disperse within the sealed cavity prior to striking the liner thereby reducing momentum of the curing medium striking the liner, wherein the injection cap has a hole for receiving an inner post of a center post press, and wherein the injection cap defines a portion of the diverter cavity.

2. The system of claim 1, wherein the elongated gap is defined by the diverter and a surface of a bottom ring assembly.

3. The system of claim 1, wherein the curing medium is received by the diverter cavity from a plurality of injection ports.

4. The system of claim 1, wherein the diverter is configured to divert the curing medium such that the curing medium deflects off of a surface defining the elongated gap as the curing medium is exiting the diverter cavity.

5. The system of claim 1, further comprising a bottom ring assembly and a top ring assembly.

6. The system of claim 5, wherein the elongated gap is defined by a surface of the bottom ring assembly.

7. The system of claim 1, wherein the diverter surrounds the injection cap.

* * * * *